UNITED STATES PATENT OFFICE.

JOHN J. VINTON, OF SHARON, PENNSYLVANIA.

IMPROVEMENT IN THE MANUFACTURE OF IRON FROM BLAST-FURNACE SLAG.

Specification forming part of Letters Patent No. 143,600, dated October 14, 1873; application filed October 3, 1873.

*To all whom it may concern:*

Be it known that I, JOHN J. VINTON, of Sharon, in the county of Mercer and State of Pennsylvania, have invented certain new and useful Improvements in Method for Extracting Iron from the Slag or refuse of Iron Furnaces; and I do hereby declare the following to be a full, clear, and exact description of the invention, such as will enable others skilled in the art to which it pertains to make and use it, reference being had to the accompanying drawings, which form part of this specification.

My invention relates to the production of cast-iron from the slag or refuse of the smelting or blast furnace.

Heretofore a large percentage of good metallic iron has been thrown away with the slag, and become lost to commerce, so far as its use as metallic iron is concerned. This is more particularly the case with rich ores, such as the Missouri and lake ores, which, from their nature, flux imperfectly in the ordinary smelting-furnace. When imperfectly fluxed, the slag assumes a thick consistency, and cools with a general grayish color, and though the presence of the metal in it cannot be detected by the eye, yet the slag will be found to be of comparatively great specific gravity, and in fact contains a very large percentage of good metallic iron, often as great as the amount of metal reduced from the ore in the process of smelting.

To reduce this metal from the heavy slag of the smelting-furnace, and thereby increase the production of iron from the same amount of ore is the object of my invention.

To accomplish the desired result, I employ a cupola-furnace; but furnaces specially adapted to the purpose may be constructed and conveniently used in connection with the blast-furnaces when the iron is smelted.

The heavy slag is first pulverized or broken up into small pieces, or it may be made granulous or spongy by passing water or air through it when in a molten state, or in any of the well-known ways. A bed of coke or other suitable fuel is first placed in the cupola, and on the top of the coke a small quantity of scrap or other oxidized iron (preferably scale or black oxide of iron) is sprinkled. The slag to be operated on is then introduced, as evenly as possible, on the top of the coke and iron oxide, and on the top of the slag I sprinkle a small quantity of limestone broken up into small pieces; then a layer of coke, followed with scrap and scale, slag, and lime, as before, alternately until the whole cupola is charged. The fuel is then ignited, and when the fire is above the tuyeres the blast is turned onto the full. Owing to the presence of the iron oxides the heat is very great when brought in contact with the slag, and the latter is speedily reduced, and as the operation goes on fresh charges of the materials are supplied from the top of the cupola, provision being made for the passage of the remaining slag from the furnace at a point below the tuyeres.

In this way it will be seen that the process is continuous, and the furnace is not permitted to get cool.

The charge is made up in about the following proportions, but may be slightly varied, as occasion requires. After the furnace is in operation, first, three bushels of coke; second, fifty pounds iron oxide, (scrap or scale;) third, eight hundred pounds slag; fourth, one-fourth of a bushel of limestone, thrown into the cupola in succession, and from time to time, as required.

When there is much sulphur in the iron, a small quantity of the black oxide of manganese may be blown in through the tuyeres, and salt or litharge, or a mixture of any two, or all three, of these ingredients may be used in this manner with good effect. The iron thus obtained is run into molds in the usual way.

What I claim as my invention, and desire to secure by Letters Patent, is—

The herein-described method of reducing iron from the slag or refuse of blast or smelting furnaces, substantially as set forth.

In testimony that I claim the foregoing I have hereunto set my hand this 1st day of October, 1873.

JOHN J. VINTON.

Witnesses:
A. McCALLUM,
I. HANWAY.